United States Patent
Savage et al.

(10) Patent No.: US 6,847,937 B1
(45) Date of Patent: Jan. 25, 2005

(54) SELF-SERVICE TERMINAL

(75) Inventors: John G. Savage, Fife (GB); Jonathan S. Black, Dundee (GB)

(73) Assignee: NCR Corporation, Dayton, OH (US)

( * ) Notice: Subject to any disclaimer, the term of this patent is extended or adjusted under 35 U.S.C. 154(b) by 588 days.

(21) Appl. No.: 09/710,343

(22) Filed: Nov. 9, 2000

(30) Foreign Application Priority Data

Dec. 3, 1999 (GB) .............................. 9928737

(51) Int. Cl.[7] .......................................... G06F 17/16
(52) U.S. Cl. ............................... 705/21; 705/1; 705/8; 705/43
(58) Field of Search ..................... 705/21, 7

(56) References Cited

U.S. PATENT DOCUMENTS

| | | | | |
|---|---|---|---|---|
| 5,291,554 A | * | 3/1994 | Morales ..................... | 380/211 |
| 5,588,146 A | * | 12/1996 | Leroux ........................ | 707/1 |
| 6,311,165 B1 | * | 10/2001 | Coutts et al. ................ | 705/21 |
| 6,327,570 B1 | * | 12/2001 | Stevens ....................... | 705/7 |

FOREIGN PATENT DOCUMENTS

| | | |
|---|---|---|
| GB | 2137401 | 10/1984 |
| WO | 9843212 | 10/1998 |
| WO | 9852163 | 11/1998 |
| WO | 9908238 | 2/1999 |

OTHER PUBLICATIONS

Banks exploring additional techno;ogy–based services. (EFT/POS, home banking) Buckler, Grant Computing Canada, vol. 15, No.: 20, p.: 60(2), Oct. 12, 1989.*
How Technology is Changing Banking– Gart, Ala,– Journal of Retail Banking, v14n1, p.: 35–43, Spring 1992.*
Authorizations anywhere: cellular EFT aids mobile stores. (electronic funds transfer)– Chain Store Age Executive with Shopping Center Age, vol.: 71, No.: 6, p. 100(1), Jun. 1995.*
WO 84/03575, Applicant– Mermaid Distributors Limited.*

* cited by examiner

*Primary Examiner*—James P. Trammell
*Assistant Examiner*—Daniel L. Greene
(74) *Attorney, Agent, or Firm*—Michael Chan

(57) ABSTRACT

A self-service terminal system (10) is described. The system (10) includes a self-service terminal (14) and a host (12) interconnected by a network (16). The host (12) is operable to transfer software (90, 92) to the terminals (14) for subsequent transfer by a terminal (14) to a portable device (24) presented by a user (96). Each terminal (14) includes a communications port (78), so that the terminal (14) is operable to transfer software (90, 92) from the terminal (14) to a portable device (24) using the communications port (78). A method of operating a self-service terminal system is also described.

9 Claims, 3 Drawing Sheets

SELF-SERVICE TERMINAL

BACKGROUND OF THE INVENTION

The present invention relates to a self-service terminal (SST), such as an automated teller machine (ATM). In particular, the invention relates to an ATM for offering complex financial services.

When a customer is contemplating a financial service, such as a loan or mortgage, the customer generally obtains an estimate of the cost involved from several different institutions before selecting a service provided by a particular institution. This is because many financial services rely on parameters that change frequently or that vary from institution to institution, for example interest rates; these parameters affect the cost of the service. This means that customers typically make a first visit to each of a plurality of financial institutions to obtain information about a financial service, and then a second visit to a selected one of the financial institutions to request the financial service, that is, to execute the transaction.

ATMs are capable of performing complex financial transactions and offering users complex financial services, such as arranging loans, mortgages, and such like. However, ATM users are reluctant to use these services because of the public environment of most ATMs and because of the time required to complete these complex transactions.

SUMMARY OF THE INVENTION

It is among the objects of embodiments of the present invention to obviate or mitigate one or more of the above disadvantages or other disadvantages associated with conventional SSTs.

According to a first aspect of the present invention there is provided a self-service terminal characterized in that the terminal includes a communications port, where the terminal is operable to transfer software for execution on a portable device from the terminal to the portable device using the communications port.

Preferably, the communications port is a wireless port, such as an infra-red port, a radio-frequency port, a Bluetooth (trade mark) port, or such like. One advantage of using a wireless port is that the portable device does not require a predefined physical coupler for coupling to the terminal. This allows many different types of portable device to be used with the terminal. It also reduces the possibility of damage to the coupler due to, for example, ingress of moisture or dirt, or vandalism.

Preferably, the terminal is interconnected to a host, and the terminal is operable to receive software from the host for transferring to a portable device.

Preferably, the software is related to a financial service and includes parameters that are correct at the time the software was transferred. The software may relate to, for example, a mortgage calculator, a loan repayment calculator, or such like.

In some embodiments, the software may have a time to live, so that once the time to live has expired the software automatically deletes itself. In other embodiments, the software may only delete certain parameters once the time to live has expired. This enables a user to update the parameters at an ATM without having to download the entire software program.

Preferably, the software is operable to receive details from a user and to prepare a response program for transmitting back to an SST, where the response program includes details of a transaction to be executed by the SST. This feature has the advantage that the software is able to interact with a user to assist the user in preparing a transaction (for example, for a loan, the amount of money borrowed and the length of time that the money will be borrowed for). In addition, once the user has prepared a transaction, the software is able to create a sub-program (the response program) for transmitting to an ATM so that the user does not need to re-enter the transaction at the ATM. This reduces the amount of time a user has to spend operating an ATM to execute a transaction.

By virtue of this aspect of the invention, a user is able to download software from a financial institution to his/her portable device for executing directly on the portable device. The user is then able to use the software to estimate the cost involved in a particular financial service and to vary certain features of the service, for example, the user may estimate repayments on a loan over one year, two years, and five years, for a loan amount of one thousand pounds, two thousand pounds, or five thousand pounds. As the software is executed by the user's portable device, the user is able to estimate the cost of services in any location (for example, when they are at home) and at any time they desire, thus improving the comfort and privacy of the transaction. As the software is transferred to the user's portable device from a public access, self-service, terminal, it is very convenient for the user.

According to a second aspect of the invention there is provided a self-service terminal system comprising a host and a plurality of self-service terminals, the host and the terminals being mutually interconnected by a network, characterized in that the host is operable to transfer software to the terminals for subsequent transfer by a terminal to a portable device presented by a user.

According to a third aspect of the invention there is provided a method of operating a self-service terminal system characterized by the steps of: providing a software program at a central location; transferring the software program to one or more terminals using a network connection; and, in response to a request from a user, transferring the software program to a portable device presented to a terminal by the user, so that the user can execute the software program directly on the portable device.

According to a fourth aspect of the invention there is provided a self-service terminal characterized in that the terminal includes a communications port, where the terminal is operable to transfer software from the terminal to a portable device using the communications port, and the terminal is configured to receive payment from a user for the transferred software.

The terminal may be configured to receive payment by direct transfer from the user's bank account. Alternatively, the terminal may be configured to receive deposit of cash from the user.

By virtue of this aspect of the invention, the terminal is able to supply a user with valuable software and to make a charge for the software. The software may not be related to financial services, but may be a new application for the portable device.

Preferably, the portable device is a handheld unit, such as a personal digital assistant (PDA), a cellular telephone, or such like.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
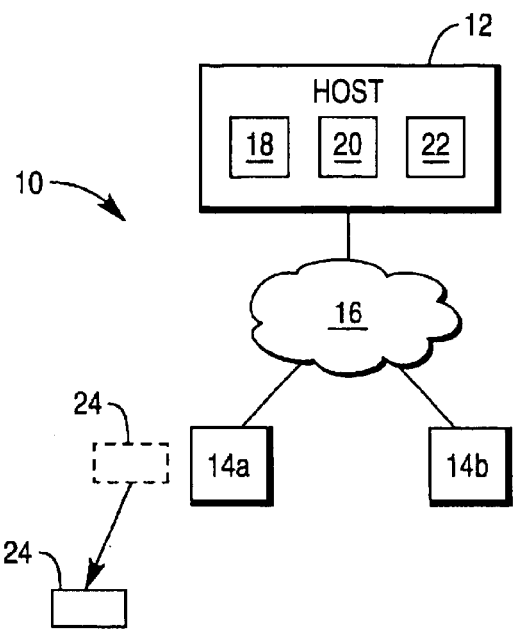
FIG. 1 is a block diagram of a self-service terminal system in accordance with one embodiment of the present invention.

Referring now to FIG. 1, which is a block diagram of a self-service terminal system 10 in accordance with one embodiment of the present invention, the system 10 comprises a host 12 interconnected to a plurality of SSTs 14 (only two are shown) by a network 16. The SSTs 14 are in the form of ATMs. The host 12 includes an authorization facility 18, a back-office facility 20 and a software repository 22 for storing software programs for distribution to ATMs 14 across the network 16.

In addition to authorizing ATM transactions, the host 12 operates as an interactive server from which ATMs 14 can download software programs, as will be described in more detail hereinafter. The ATMs 14 are physically remote from each other, but are shown in proximity in FIG. 1 for clarity.

FIG. 1 also shows a portable device 24 in the form of a PDA, such as a 3Com PalmIIIx (trade mark). The PDA 24 is shown in broken line adjacent to one of the ATMs 14a and in solid line further away from the ATM 14a to illustrate that the PDA 24 is typically presented to an ATM 14a and then used remote from the ATM 14a.

Figure 2:
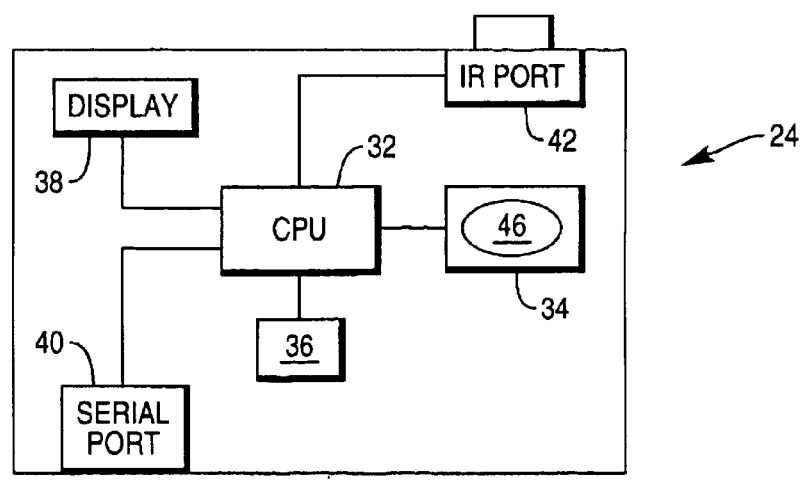
FIG. 2 is a block diagram illustrating the architecture of a portable device used in FIG. 1.

Referring now to FIG. 2, which is a block diagram illustrating the architecture of the PDA 24 used in FIG. 1, PDA 24 comprises a controller 32 and associated volatile memory 34 and non-volatile memory 36, a touch-sensitive display 38, a serial communication port 40 for receiving a connector, and a wireless communication port 42 in the form of an IrDA (Infra-red data association) compliant infra-red port. The controller 32 is responsible for the operation of the terminal 24, and is coupled to the display 38, serial port 40, and IR port 42. In use, the controller 32 loads a simple operating system 46 into the volatile memory 34.

Figure 3:
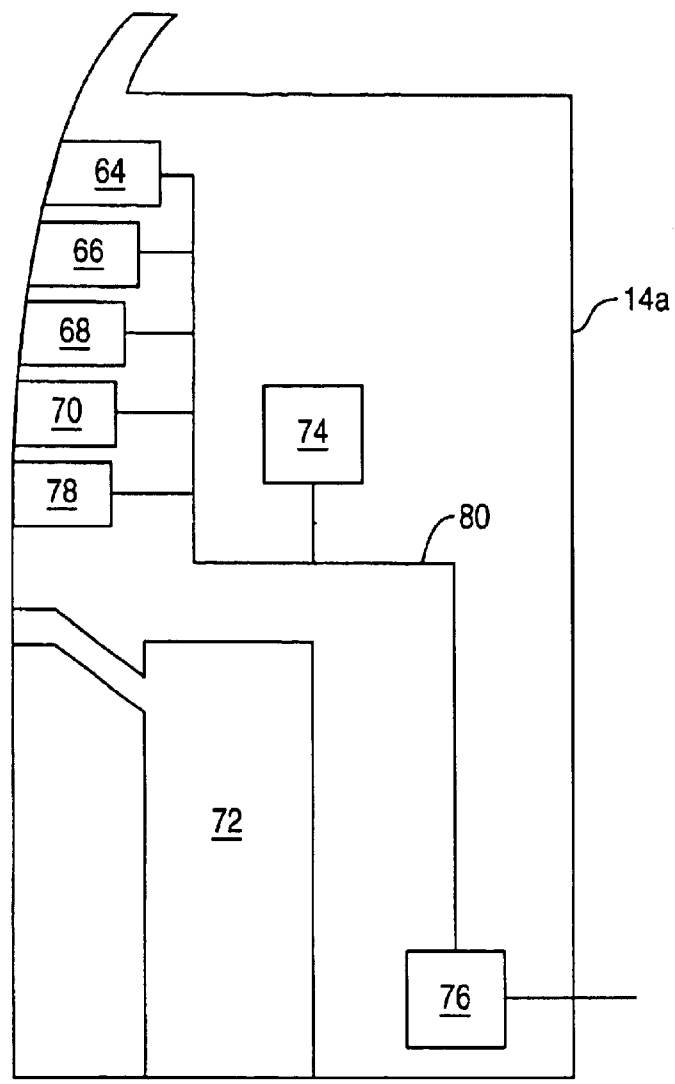
FIG. 3 is a block diagram illustrating a self-service terminal used in FIG. 1.

Referring now to FIG. 3, which shows an ATM 14 of FIG. 1 in more detail, the ATM 14 includes a display module 64, an encrypting keypad module 66, a magnetic card reader/writer (MCRW) module 68, a receipt printer module 70, a cash dispenser module 72, an ATM controller module 74 for controlling the operation of the various modules, a network connection module 76 for communicating with the host 12 (FIG. 1) via network 16 (FIG. 1), and an IR port module 78. All of the modules within the ATM 14 are interconnected by a proprietary internal bus 80.

The IR port module 78 includes an IR to electrical signal converter, and conforms to the IrDA standard for wireless communication of data.

The financial institution owning the ATM system 10 creates software programs for one or more of their financial services.

Figure 4:
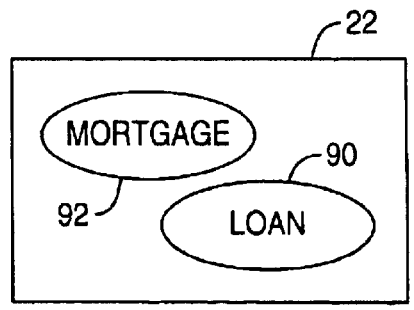
FIG. 4 is a block diagram of a software repository used in FIG. 1.

Referring now to FIG. 4, which illustrates the software repository 22, in this embodiment, the institution creates a program 90 for a personal loan, and a program 92 for a mortgage. The correct interest rates for each of these services (which depend on the length of time the loan is taken out for, as well as other factors) and other parameters which affect the cost of the services are hard-coded into these programs 90, 92. These programs 90, 92 are also given a time-to-live: that is, each program 90, 92 is given a time period during which its parameters are valid. The time-to-live is set to one month in this embodiment.

The host 12 automatically transfers the programs 90, 92 to each ATM 14. This is typically done during the night, or at some other time period when network traffic is low. If the programs 90, 92 are updates to programs that are currently stored on the ATMs 14, then the previous programs are automatically deleted by the ATMs 14. Each ATM 14 stores the transferred programs 90, 92 on its ATM controller 74 (FIG. 3).

Figure 5:
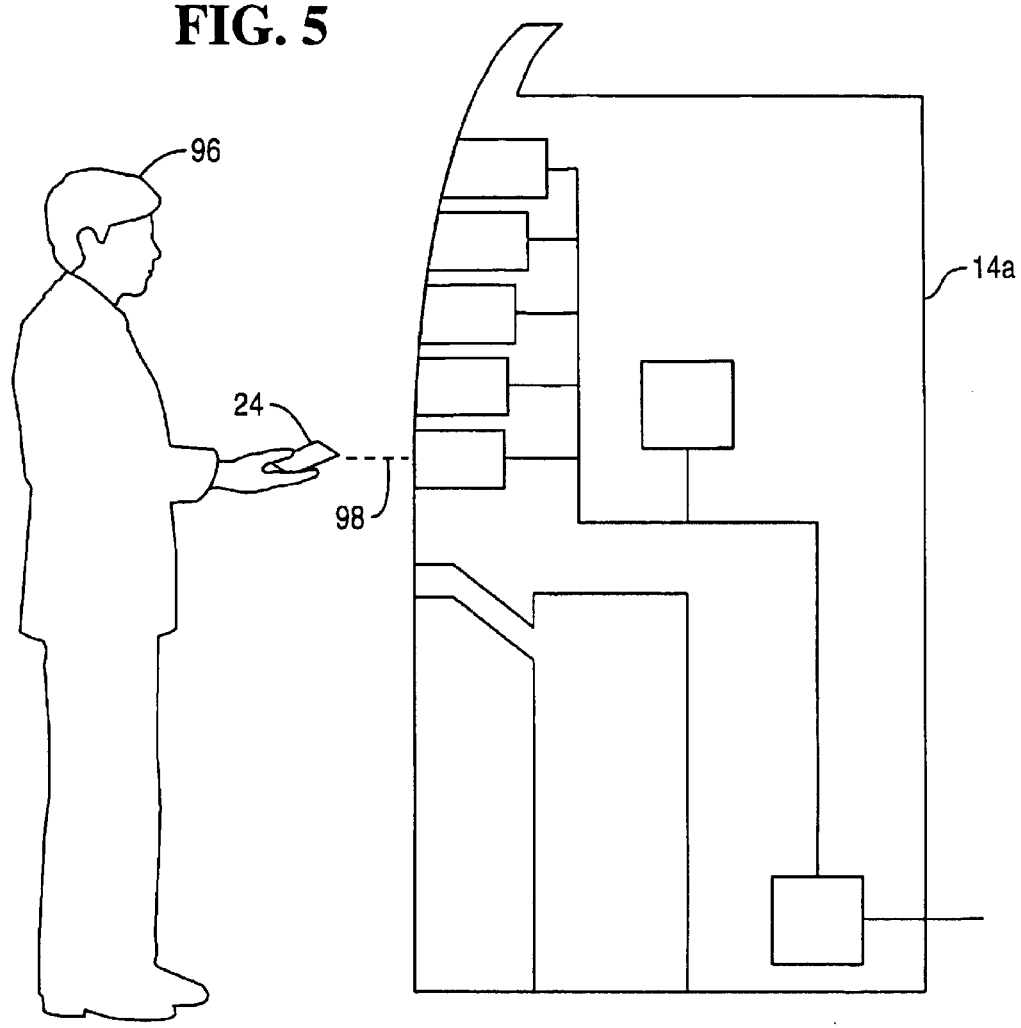
FIG. 5 is a schematic diagram illustrating a user operating the portable device of FIG. 2 and the SST of FIG. 3.

Referring to FIG. 5, if a user 96 wishes to receive information relating to the cost of a loan, then the user approaches ATM 14a, inserts his/her magnetic stripe card into the MCRW module 68 via a slot in the ATM 14a, enters a PIN (personal identification number), and selects a download loan program option which the controller 74 presents on display module 64.

The user then presents his/her PDA 24; that is, the user aligns his/her PDA 24 with the IR port module 78 in the ATM 14a.

The ATM 14a then transfers the loan program 90 from the controller 74 to the IR port 78, which converts the electrical signals into an IR signal and transmits the IR signal to the PDA's IR port 42; the transmission is illustrated by broken line 98.

The PDA's IR port 42 receives the IR signal and converts it into an electrical signal for storing in the non-volatile memory 36. The ATM 14a then returns the magnetic stripe card to the user 96 and the user 96 leaves the vicinity of the ATM 14a.

At some later time, the user 96 can execute the loan program 90 stored in non-volatile memory 36, so that the loan program 90 is loaded into volatile memory 34.

Loan program 90 allows the user 96 to enter user-specific data and generates estimates for the cost of a loan for any time period entered by the user 96. Each time the loan program 90 is executed, the program 90 determines if the time-to-live has elapsed: if the time-to-live has elapsed then the loan program 90 deletes itself from the PDA 24.

Figure 6:
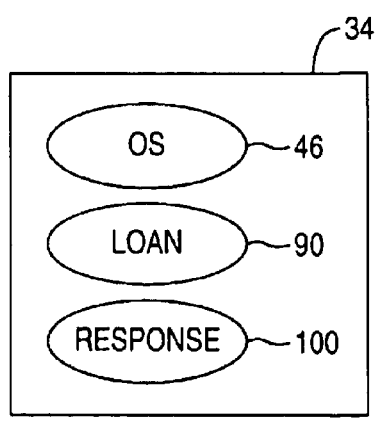
FIG. 6 is a block diagram illustrating the contents of a memory of the portable device of FIG. 2 after interaction with a user.

Referring to FIG. 6, if the user 96 decides to obtain a loan based on details he/she has entered into the loan program 90, then the program 90 creates a response program 100 containing the entered details for the user 96. The response program 100 is a prepared transaction that is operable to execute directly on an ATM controller 74. Thus, the user 96 conveys the PDA 24 to an ATM 14 and transmits the response program 100 to the ATM 14, which executes the transaction directly and confirms to the user 96 that a loan has been agreed by the ATM 14.

Various modifications may be made to the above described embodiment within the scope of the invention, for example, in other embodiments, the SSTs may be information kiosks rather than ATMs. In other embodiments, the time-to-live may be shorter or longer than one month. In other embodiments, services other than financial services may be provided by the software program. In other embodiments, the ATM may charge for the software that it transferred to the user's PDA. In other embodiments, the portable device may be a cellular telephone, or such like.

What is claimed is:

1. A method of operating a self-service terminal system to conduct a self-service transaction for a self-service user, the method comprising:

transmitting via a network connection a first executable software program from a self-service terminal to a portable terminal when the user presents the portable terminal to the self-service terminal;

executing the first executable software program in the portable terminal to generate a second executable software program when the user enters user preferences via the portable terminal; and transmitting via the network connection the second executable software program from the portable terminal to the self-service terminal to allow the second executable software program to be executed in the self-service terminal to conduct the self-service transaction for the user.

2. A self-service terminal system for enabling a self-service user to conduct a self-service transaction, the self-service terminal system comprising:

a self-service terminal including (i) means for processing self-service transactions, (ii) means for storing a first executable software program, and (iii) means for transmitting the first executable software program to a portable device of the user, and a portable device including (i) means for receiving the first executable software program transmitted from the self-service terminal, and (ii) means for executing the first executable software program to prepare a second executable software program for transmitting back to the self-service terminal to allow the second executable software program to be executed by the self-service terminal to conduct the self-service transaction for the user.

3. A financial self-service terminal comprising:

storage means for storing executable software which is for other than purchasing or licensing by another party; and processing means including (i) means for transferring the executable software from the storage means to a user's portable device for execution on the portable device to provide a response for transmitting back to the self-service terminal, and (ii) means for receiving the response from the portable device after the software has been executed on the portable device.

4. A financial self-service terminal according to claim 3, further comprising a wireless communications port.

5. A financial self-service terminal according to claim 3, further comprising (i) means for connecting to a host, and (ii) means for receiving the executable software from the host for transferring to the portable device.

6. A financial self-service terminal according to claim 3, wherein the executable software relates to a financial service and includes parameters that are correct at the time the executable software is transferred.

7. A financial self-service terminal according to claim 3, wherein the executable software has a time to live, so that once the time to live has expired the executable software automatically deletes itself.

8. A self-service terminal system for enabling a self-service user to conduct a self-service transaction, the self-service terminal system comprising:

a self-service terminal including (i) means for processing self-service transactions and (ii) means for storing a first executable software program; and a portable device for receiving and executing the first executable software program transmitted from the self-service terminal, the first executable software program including (i) means for receiving user preferences from the user, (ii) means for providing the user with updated information based upon the received user preferences, and (iii) means for preparing a second executable software program including the received user preferences for transmitting back to the self-service terminal to allow the second executable software program to be executed by the self-service terminal to conduct the self-service transaction.

9. A financial self-service terminal in the form of an automated teller machine (ATM) for enabling a user to conduct a financial transaction, the ATM comprising:

an ATM controller for (i) storing executable software which can interact with the user to assist the user in preparing the financial transaction, (ii) transferring the executable software to a portable device of the user when the user presents the portable device to the ATM controller to allow the user to prepare the financial transaction by entering user preferences relating to the financial transaction via the portable device, and (iii) receiving a response including the user preferences from the portable device to allow the ATM controller to execute the financial transaction prepared by the user.

\* \* \* \* \*